United States Patent
Tokumitsu et al.

(10) Patent No.: US 12,483,698 B2
(45) Date of Patent: Nov. 25, 2025

(54) VIDEO CODING APPARATUS, VIDEO CODING METHOD, VIDEO CODING PROGRAM, AND NON-TRANSITORY RECORDING MEDIUM

(71) Applicant: NEC Corporation, Tokyo (JP)

(72) Inventors: Kenta Tokumitsu, Tokyo (JP); Keiichi Chono, Tokyo (JP); Tomonori Yanagita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 18/281,872

(22) PCT Filed: Jan. 20, 2022

(86) PCT No.: PCT/JP2022/002002
§ 371 (c)(1),
(2) Date: Sep. 13, 2023

(87) PCT Pub. No.: WO2022/201808
PCT Pub. Date: Sep. 29, 2022

(65) Prior Publication Data
US 2024/0187579 A1   Jun. 6, 2024

(30) Foreign Application Priority Data
Mar. 23, 2021  (JP) ................. 2021-049038

(51) Int. Cl.
*H04N 19/00*    (2014.01)
*H04N 19/117*   (2014.01)
(Continued)

(52) U.S. Cl.
CPC .......... *H04N 19/117* (2014.11); *H04N 19/14* (2014.11); *H04N 19/172* (2014.11);
(Continued)

(58) Field of Classification Search
None
See application file for complete search history.

(56) References Cited

U.S. PATENT DOCUMENTS

| | | | |
|---|---|---|---|
| 2014/0226712 A1* | 8/2014 | Suzuki | H04N 19/13 375/240.02 |
| 2022/0159249 A1* | 5/2022 | Taquet | H04N 19/70 |
| 2024/0098259 A1* | 3/2024 | Misra | H04N 19/117 |

FOREIGN PATENT DOCUMENTS

WO    2013/005659 A1   1/2013

OTHER PUBLICATIONS

International Search Report for PCT Application No. PCT/JP2022/002002, mailed on Mar. 22, 2022.
(Continued)

*Primary Examiner* — Zhihan Zhou
(74) *Attorney, Agent, or Firm* — Sughrue Mion, PLLC

(57) ABSTRACT

In order to achieve improved compression efficiency while controlling implementation costs, an adaptive loop filter includes an acquisition unit configured to acquire statistical information on a picture to be coded, an allocation unit configured to allocate a single filter set common to a plurality of blocks included in the picture, based on the statistical information on the picture, and a filter processing unit configured to execute adaptive loop filter processing on each of the plurality of blocks, by using the single filter set.

17 Claims, 13 Drawing Sheets

(51) Int. Cl.
*H04N 19/14* (2014.01)
*H04N 19/172* (2014.01)
*H04N 19/176* (2014.01)
*H04N 19/186* (2014.01)
*H04N 19/82* (2014.01)

(52) U.S. Cl.
CPC ......... *H04N 19/176* (2014.11); *H04N 19/186* (2014.11); *H04N 19/82* (2014.11)

(56) References Cited

OTHER PUBLICATIONS

Written opinion for PCT Application No. PCT/JP2022/002002, mailed on Mar. 22, 2022.
Jianle Chen et al., "Algorithm description for Versatile Video Coding and Test Model 11 (VTM 11)" document JVETT2002-v1, Joint Collaborative Team on Video Coding (JCT-VC) of ITU-T SG 16 WP 3 and ISO/IEC JTC 1/SC 29/WG 11, 20th Meeting, by teleconference, Oct. 7-16, 2020, pp. 1-103.
Jianle Chen et al., "Algorithm description for Versatile Video Coding and Test Model 11 (VTM 11)" document JVETT2002-v2, Joint Collaborative Team on Video Coding (JCT-VC) of ITU-T SG 16 WP 3 and ISO/IEC JTC 1/SC 29/WG 11, 20th Meeting, by teleconference, Oct. 7-16, 2020, pp. 1-102.
Chen, Ching-Yeh, et al., CE8 Subset2: A Joint Proposal on Improving the Adaptive Loop Filter in TMuCO. 9 by MediaTek, Qualcomm, and Toshiba, Joint Collaborative Team on Video Coding (JCT-VG) of ITU-T SG16 WP3 and ISO/IEC JTC1/SC29/WG11, JCTVC-D119, Jan. 24, 2011, pp. 1-19.
Chen, Jianle, et al., Algorithm description for Versatile Video Coding and Test Model 11 (VTM 11), Joint Video Experts team (JVET) of ITU-T SG 16 WP 3 and ISO/IEC JTC 1/SC 29/WG 11, JVET-T2002-v2, Jan. 6, 2021, pp. 69-75.
English translation of Written opinion for PCT Application No. PCT/JP2022/002002, mailed on Mar. 22, 2022.

* cited by examiner

VIDEO CODING APPARATUS, VIDEO CODING METHOD, VIDEO CODING PROGRAM, AND NON-TRANSITORY RECORDING MEDIUM

This application is a National Stage Entry of PCT/JP2022/002002 filed on Jan. 20, 2022, which claims priority from JP Patent Application 2021-049038 filed on Mar. 23, 2021, the contents of all of which are incorporated herein by reference, in their entirety.

TECHNICAL FIELD

The present invention relates to a video coding apparatus, a video coding method, a video coding program, and a non-transitory recording medium.

BACKGROUND ART

In Versatile Video Coding (VVC) standard, for a reconstructed image, processing including a deblocking filter, a sample adaptive offset and the like is applied, and then an adaptive loop filter is applied. With the application of such an adaptive loop filter, edge enhancement is reperformed on the reconstructed image with respect to a picture to which the deblocking filter has been applied. This makes it possible to generate a reconstructed image (decoded image) with a small difference from an original image (See, e.g., Non Patent Literature 1). That is, the compression efficiency can be enhanced by adjusting the balance between the code amount and the prediction accuracy appropriately.

CITATION LIST

Non Patent Literature

[NPL 1] Jianle Chen et al., "Algorithm description for Versatile Video Coding and Test Model 11 (VTM 11)" document JVET-T2002-v1, Joint Collaborative Team on Video Coding (JCT-VC) of ITU-T SG 16 WP 3 and ISO/IEC JTC 1/SC 29/WG 11, 20th Meeting, by teleconference, 7-16 Oct. 2020

SUMMARY

Technical Problem

For example, in the video coding technology such as the above-described VVC, a plurality of candidate filter sets are provided for the adaptive loop filter. This makes it possible to use any one filter set suitable for the characteristics of each block included in the reconstructed image. However, determining a filter set suitable for the characteristics of the block requires iteration processing for calculating and evaluating a difference cost between an original image and the reconstructed image, and the like. Therefore, in the video coding, it is desirable to achieve improved compression efficiency while controlling implementation costs.

An example object of the present invention is to provide a video coding device, a video coding method, a video coding program, and a non-transitory recording medium that enable to achieve improved compression efficiency while controlling implementation costs.

Solution to Problem

According to one example aspect of the present invention, a video coding apparatus includes an acquisition unit configured to acquire statistical information on a picture to be coded, an allocation unit configured to allocate a single filter set common to a plurality of blocks included in the picture, based on the statistical information on the picture, and a filter processing unit configured to execute adaptive loop filter processing on each of the plurality of blocks, by using the single filter set.

According to one example aspect of the present invention, a video coding method includes acquiring statistical information on a picture to be coded, allocating a single filter set common to a plurality of blocks included in the picture, based on the statistical information on the picture, and executing adaptive loop filter processing on each of the plurality of blocks, by using the single filter set.

According to one example aspect of the present invention, a video coding program causes a processor to execute acquiring statistical information on a picture to be coded, allocating a single filter set common to a plurality of blocks included in the picture, based on the statistical information on the picture, and executing adaptive loop filter processing on each of the plurality of blocks, by using the single filter set.

According to one example aspect of the present invention, a non-transitory recording medium is a computer readable medium, and stores a program that causes a processor to execute acquiring statistical information on a picture to be coded, allocating a single filter set common to a plurality of blocks included in the picture, based on the statistical information on the picture, and executing adaptive loop filter processing on each of the plurality of blocks, by using the single filter set.

Advantageous Effects of Invention

One example aspect of the present invention enables to achieve improved compression efficiency while controlling implementation costs. Note that, according to the present invention, instead of or together with the above effects, other effects may be exerted.

DESCRIPTION OF THE EXAMPLE EMBODIMENTS

In the following, example embodiments of the present invention will be described with reference to the accompanying drawings. Note that, in the Specification and drawings, elements to which similar descriptions are applicable are denoted by the same reference signs, and overlapping descriptions are hence omitted.

Descriptions will be given in the following order.
1. First Example Embodiment
   1.1. First Example
   1.2. Second Example
      1.2.1. Configuration of Video Coding Apparatus 1
      1.2.2. Configuration of Loop Filter 60
      1.2.3. Configuration of Adaptive Loop Filter 100
      1.2.4. Operation Example
2. Second Example Embodiment
   2.1. Configuration
   2.2. Operation Example
3. Other Example Embodiments

1. First Example Embodiment

The following is a description of an exemplary first example embodiment to which the present invention is applied.

1.1. First Example

First, as a first example of the first example embodiment, adaptive loop filter processing performed in video coding processing will be described.

(1) Configuration of Video Coding Apparatus 1000

Figure 1:
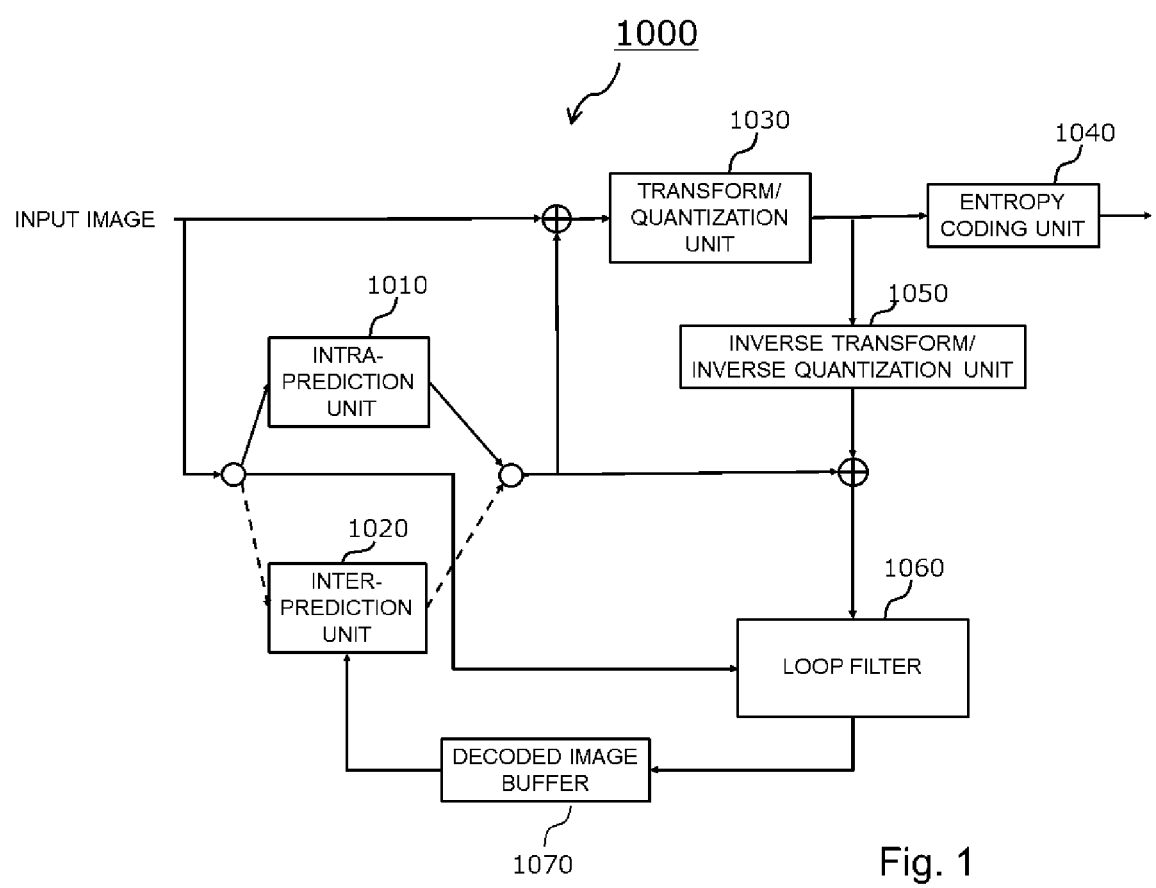
FIG. 1 is a block diagram illustrating a schematic configuration of a video coding apparatus 1000 applied to coding standards such as Versatile Video Coding (VVC), for example.

FIG. 1 is a block diagram illustrating a schematic configuration of a video coding apparatus 1000 applied to coding standards such as Versatile Video Coding (VVC), for example. Referring to FIG. 1, the video coding apparatus 1000 includes an intra-prediction unit 1010, an inter-prediction unit 1020, a transform/quantization unit 1030, an entropy coding unit 1040, an inverse transform/inverse quantization unit 1050, a loop filter 1060, and a decoded image buffer 1070.

Each of the intra-prediction unit 1010 and the inter-prediction unit 1020 generates, for each block, a prediction image for an input image. Specifically, in the case of performing in-screen prediction for a block to be processed, the intra-prediction unit 1010 generates a prediction image for the block to be processed. Meanwhile, in the case of performing inter-screen prediction for the block to be processed, the inter-prediction unit 1020 generates a prediction image by referring to a decoded image stored in the decoded image buffer 1070.

The transform/quantization unit 1030 executes frequency transformation on a prediction error image that is obtained by subtracting the prediction image from the input image. Furthermore, the transform/quantization unit 1030 quantizes the frequency transformed prediction error image (transform coefficients).

The entropy coding unit 1040 executes entropy coding on a transformed and quantized value, and difference information on a motion vector that is a prediction parameter used by the inter-prediction unit 1020, based on Context-based Adaptive Binary Arithmetic Coding (CABAC), for example. The entropy-coded code word is transmitted externally as a bit stream via a communication line, such as the Internet, for example.

The inverse transform/inverse quantization unit 1050 executes inverse quantization on the transformed and quantized value. Further, the inverse transform/inverse quantization unit 1050 executes inverse frequency transformation on the frequency transform coefficient that has been subject to the inverse quantization. The prediction image is added to a reconstructed prediction error image that has been subject to the inverse frequency transformation. The reconstructed prediction image is then fed to the loop filter 1060.

The loop filter 1060 applies various filter processes to the reconstructed prediction image to output a decoded image. The output decoded image is held in the decoded image buffer 1070. The decoded image buffer 1070 stores the reconstructed image.

(2) Configuration of Loop Filter 1060

Figure 2:
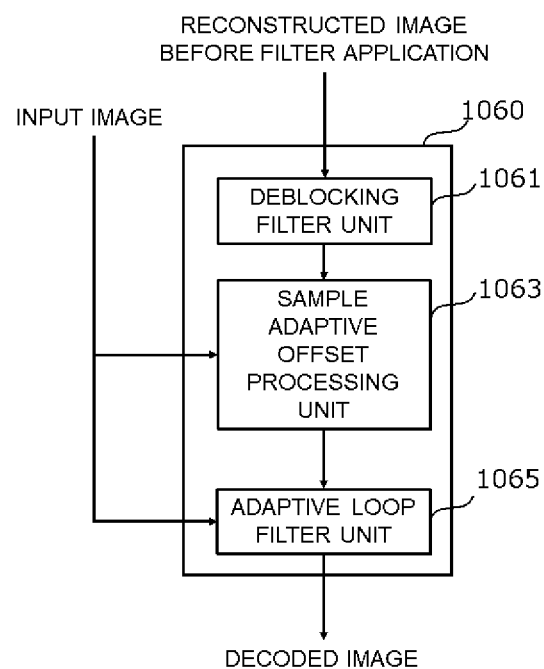
FIG. 2 is a block diagram illustrating a schematic configuration of a loop filter 1060.

FIG. 2 is a block diagram illustrating a schematic configuration of the loop filter 1060. Referring to FIG. 2, the loop filter 1060 includes a deblocking filter unit 1061, a sample adaptive offset processing unit 1063, and an adaptive loop filter 1065.

The deblocking filter unit 1061 executes filtering processing on block boundaries in order to mitigate block-like distortion caused by motion compensation and transform processing in the inter-screen prediction.

In order to reduce the coding distortion in the reconstructed image, the sample adaptive offset processing unit 1063 executes processing to add an offset value to a sample value for a sample in each block to which the deblocking filter processing has been applied.

The adaptive loop filter 1065 executes processing for reperforming edge enhancement (reshaping) on the reconstructed image to which the deblocking filter processing and the sample adaptive offset processing have been applied.

(3) Flow of Processing of Adaptive Loop Filter

Figure 3:
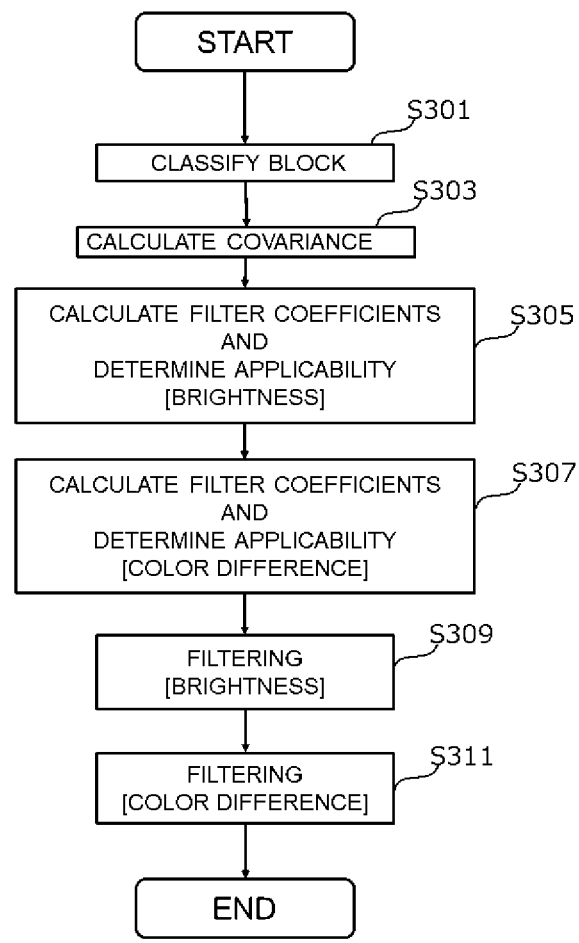
FIG. 3 is a flowchart for describing a flow of processing of an adaptive loop filter.

Next, a flow of processing of the adaptive loop filter will be described. FIG. 3 is a flowchart for describing a flow of processing of the adaptive loop filter.

In step S301, the adaptive loop filter 1065 classifies each of blocks included in a picture to be subject to filter processing. Specifically, the adaptive loop filter 1065 calculates a gradient by reference to an extended reconstructed image, and outputs block classification information indicating the classification of the block by reference to the gradient.

In step S303, the adaptive loop filter 1065 calculates covariance information on brightness information Y and respective pieces of covariance information on pieces of color difference information U and V, by determining a range for referring to an original image and the extended reconstructed image based on the block classification information.

In step S305, for the brightness, the adaptive loop filter 1065 calculates filter coefficients and determines applicability, based on the covariance information on the brightness information Y obtained in the previous step. Specifically, step S305 is performed by the processing illustrated in FIG. 4.

Figure 4:
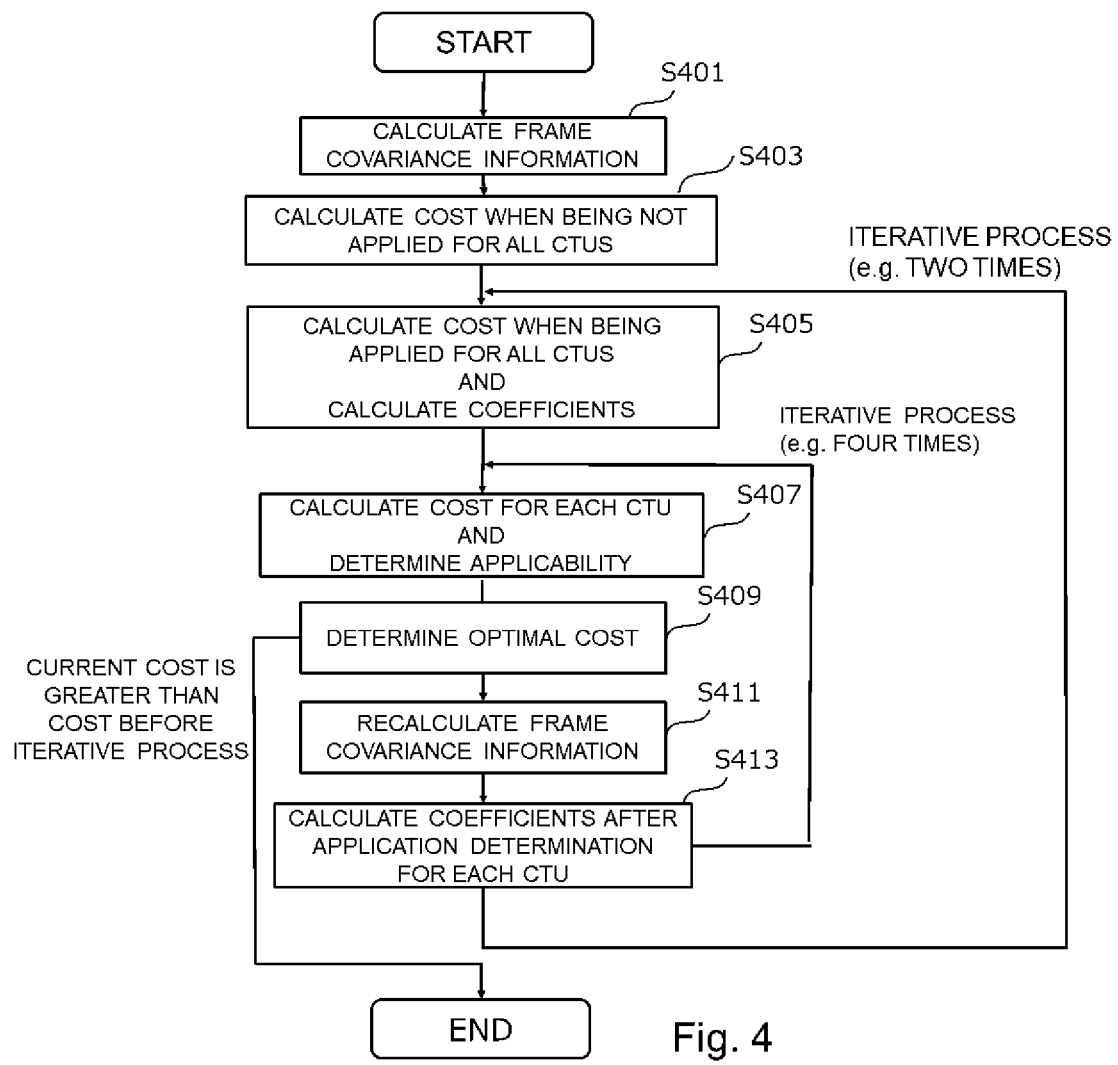
FIG. 4 is a flowchart for describing a flow of processing of calculating filter coefficients and determining applicability with respect to brightness information.

FIG. 4 is a flowchart for describing a flow of processing of calculating filter coefficients and determining applicability with respect to the brightness information.

Referring to FIG. 4, the adaptive loop filter 1065 calculates frame covariance information by summing pieces of covariance information held in units of block (e.g., Coding Tree Unit, CTU) (step S401). Next, the adaptive loop filter 1065 refers to the frame covariance information and calculates a cost when the adaptive loop filter is not applied for all CTUs, that is, a cost related to a difference between the original image and the reconstructed image (step S403). Then, the adaptive loop filter 1065 calculates a cost when the filter is applied for all CTUs, and filter coefficients (step S405). Next, the adaptive loop filter 1065 determines whether or not the filter is applicable for each CTU (step S407). Then, the adaptive loop filter 1065 compares a predetermined optimal cost with the total cost of CTUs, and updates the one with the smaller cost as the optimal cost (step S409). Here, after an iterative process described below, if the current cost is greater than the cost before the iterative process, the processing illustrated in FIG. 4 is terminated. If not, the adaptive loop filter 1065 recalculates the frame covariance from the result of the applicability list for each CTU obtained in step S407 (step S411), and calculates coefficients using the new frame covariance (step S413). Next, the adaptive loop filter 1065 executes the iterative process from step S413 to step S407 a predetermined number of times (e.g., four times), and then returns from step S413 to step S405. The iterative process returning from step S413 to step S405 is performed, for example, two times.

By determining the optimal cost through the iterative process described above, a filter set to be applied to each class is determined from among up to 25 candidate filter sets. If the filter set with a fixed value is not selected from among the 25 candidate filter sets, filter coefficients are derived from the frame covariance. Filter coefficients of the determined filter set are used to derive the filter on/off for each block. Step S305 then ends, and the process proceeds to step S307.

In step S307, for the color difference, the adaptive loop filter 1065 calculates filter coefficients and determines applicability, based on the covariance information on the color difference information U and the covariance information on the color difference information V that have been obtained in step S303. Specifically, step S307 is performed in the same manner as in FIG. 4 above.

In step S309, the adaptive loop filter 1065 executes the adaptive loop filter processing for each CTU by using the extended reconstructed image of the brightness information Y, class information, a filter set index, an applicability flag, and the like.

In step S311, the adaptive loop filter 1065 executes the adaptive loop filter processing for each CTU by using the respective extended reconstructed images of the pieces of color difference information U and V, class information, a filter set index, an applicability flag, and the like. The processing illustrated in FIG. 3 is then completed.

(4) Operation for Realizing First Example

Next, the operation for realizing the first example will be described.

The adaptive loop filter can be executed according to the processing illustrated in FIGS. 3 and 4 as described above. Specifically, the processing illustrated in FIG. 3 involves the iterative process to determine the filter set to be applied to each class, derive the coefficients of each filter set, and derive the filter on/off for each block. In other words, steps S305 and S307 illustrated in FIG. 3 can be executed through multiple memory accesses (such as access to the decoded image buffer 1070) for loading the image data.

Figure 5:
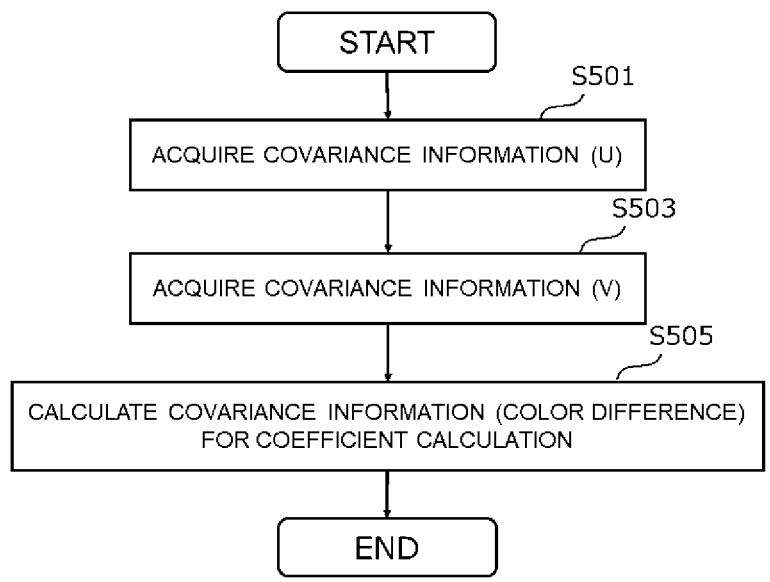
FIG. 5 is a flowchart for describing a flow of processing of deriving an average value of covariance information on color difference information U and covariance information on color difference information V.

In step S307, an average value of the covariance information on the color difference information U and the covariance information on the color difference information V is used as an input value for calculating the filter coefficients related to the color difference information. FIG. 5 is a flowchart for describing a flow of processing of deriving the average value of the covariance information on the color difference information U and the covariance information on the color difference information V.

In this configuration, the adaptive loop filter 1065 acquires the covariance information on the color difference information U (step S501), and acquires the covariance information on the color difference information V (step S503). Next, the adaptive loop filter 1065 calculates the average value of the covariance information on the color difference information U and the covariance information on the color difference information V as the covariance information for calculating the filter coefficients related to the color difference information, and ends the processing illustrated in FIG. 5.

This configuration makes it possible to generate filter coefficients that are effective for both of the color difference components U and V through the above processing illustrated in FIG. 5.

1.2. Second Example 1.2.1. Configuration of Video Coding Apparatus 1

Figure 6:
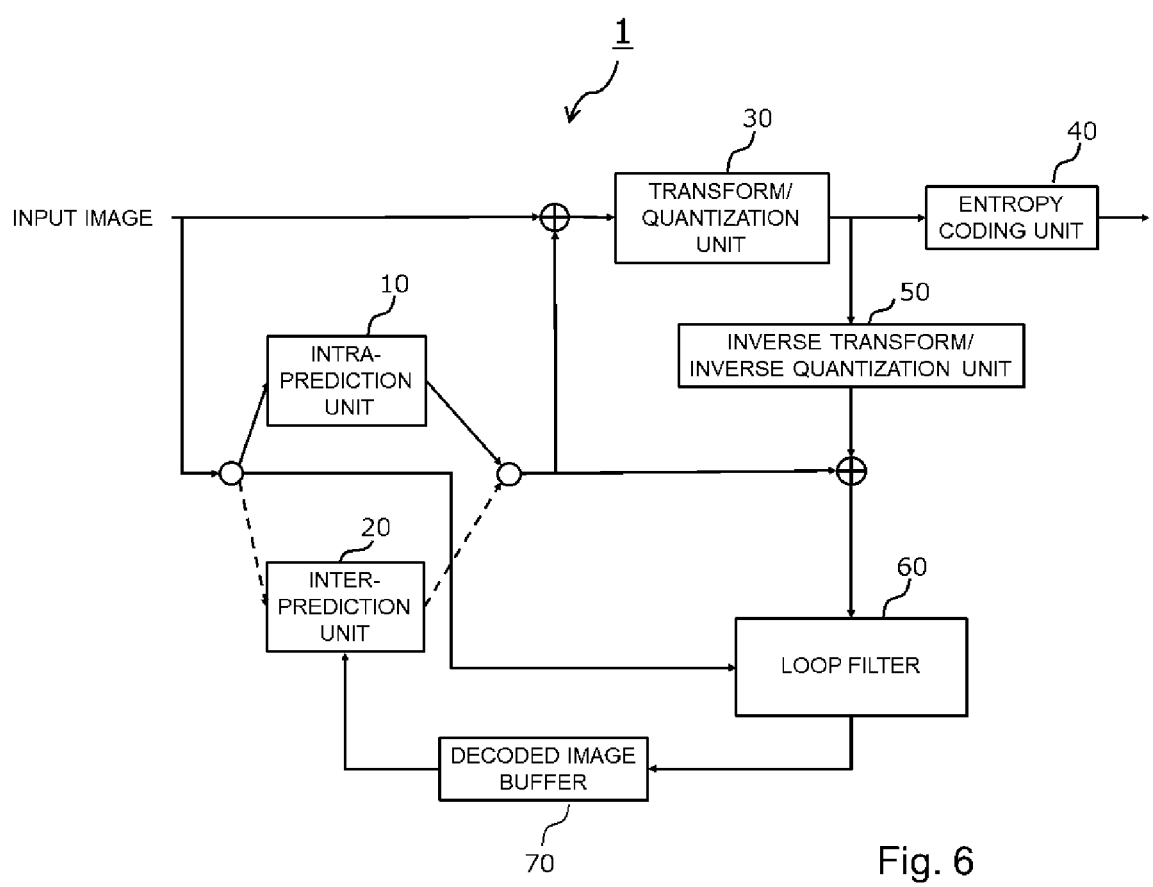
FIG. 6 is an explanatory diagram illustrating an example of a schematic configuration of a video coding apparatus 1 according to a second example of a first example embodiment to which the present invention is applied.

Next, with reference to FIG. 6, an example of a configuration of a video coding apparatus 1 for a second example of the first example embodiment will be described. FIG. 6 is an explanatory diagram illustrating an example of a schematic configuration of the video coding apparatus 1 according to the second example of the first example embodiment to which the present invention is applied. Referring to FIG. 6, the video coding apparatus 1 includes an intra-prediction unit 10, an inter-prediction unit 20, a transform/quantization unit 30, an entropy coding unit 40, an inverse transform/inverse quantization unit 50, a loop filter 60, and a decoded image buffer 70. The configuration and operation of the components other than the loop filter 60, i.e., the intra-prediction unit 10, the inter-prediction unit 20, the transform/quantization unit 30, the entropy coding unit 40, the inverse transform/inverse quantization unit 50 and the decoded image buffer 70 are the same as those for the above-described video coding apparatus 1000, and their descriptions are omitted.

Figure 7:
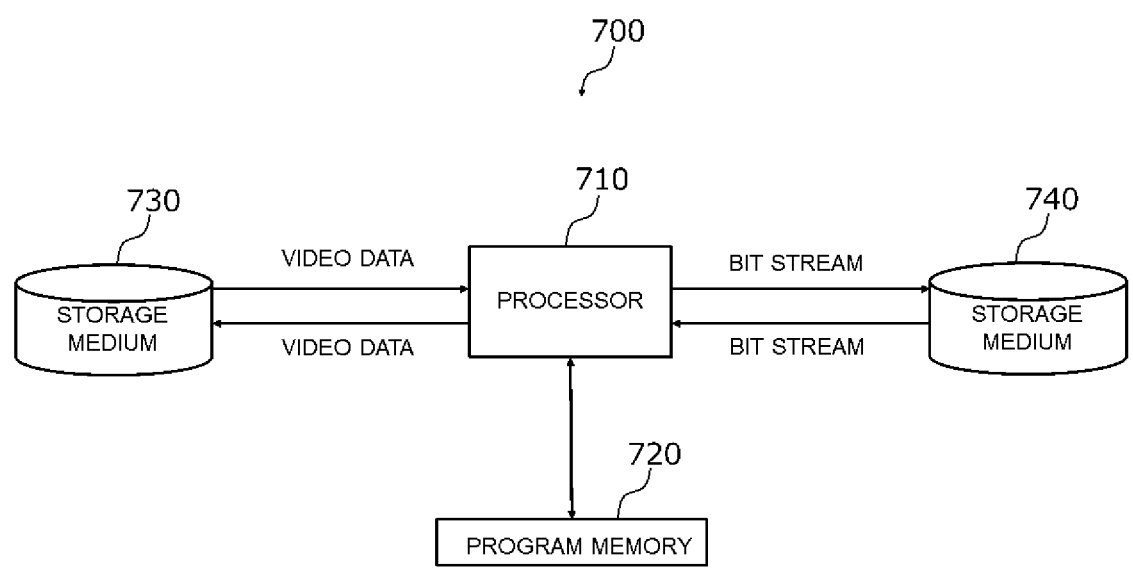
FIG. 7 is an explanatory diagram illustrating an example of a schematic configuration of hardware 700 capable of implementing the video coding apparatus 1.

The video coding apparatus 1 is implemented, for example, by a hardware configuration illustrated in FIG. 7. FIG. 7 is an explanatory diagram illustrating an example of a schematic configuration of hardware 700 capable of implementing the video coding apparatus 1. Referring to FIG. 7, the hardware 700 includes a processor 710, a program memory 720, a storage medium 730 for storing video data, and a storage medium 740 for storing a bit stream. The storage medium 730 and the storage medium 740 may be separate storage media, or they may be storage regions included in the same storage medium. A magnetic storage medium such as a hard disk can be used as the storage medium.

The hardware 700 can realize various functions of the video coding apparatus 1 by installing in the program memory 720 computer programs that realize the functions of the video coding apparatus 1.

1.2.2. Configuration of Loop Filter 60

Figure 8:
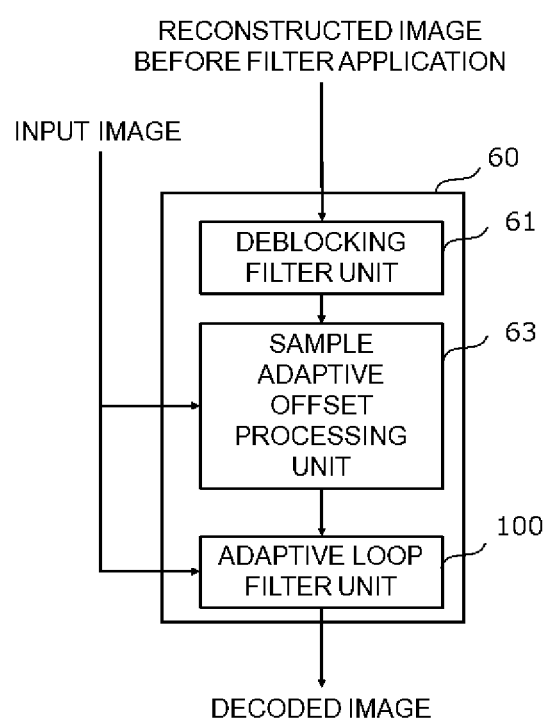
FIG. 8 is a block diagram illustrating a schematic configuration of a loop filter 60 according to the second example of the first example embodiment.

With reference to FIG. 8, an example of a configuration of the loop filter 60 will be described. FIG. 8 is a block diagram illustrating a schematic configuration of the loop filter 60 according to the second example of the first example embodiment. Referring to FIG. 8, the loop filter 60 includes a deblocking filter unit 61, a sample adaptive offset processing unit 63, and an adaptive loop filter 100. The configuration and operation of the components other than the adaptive loop filter 100, i.e., the deblocking filter unit 61 and the sample adaptive offset processing unit 63 are the same as those for the loop filter 60 included in the above-described video coding apparatus 1000, and their descriptions are omitted.

1.2.3. Configuration of Adaptive Loop Filter 100

Figure 9:
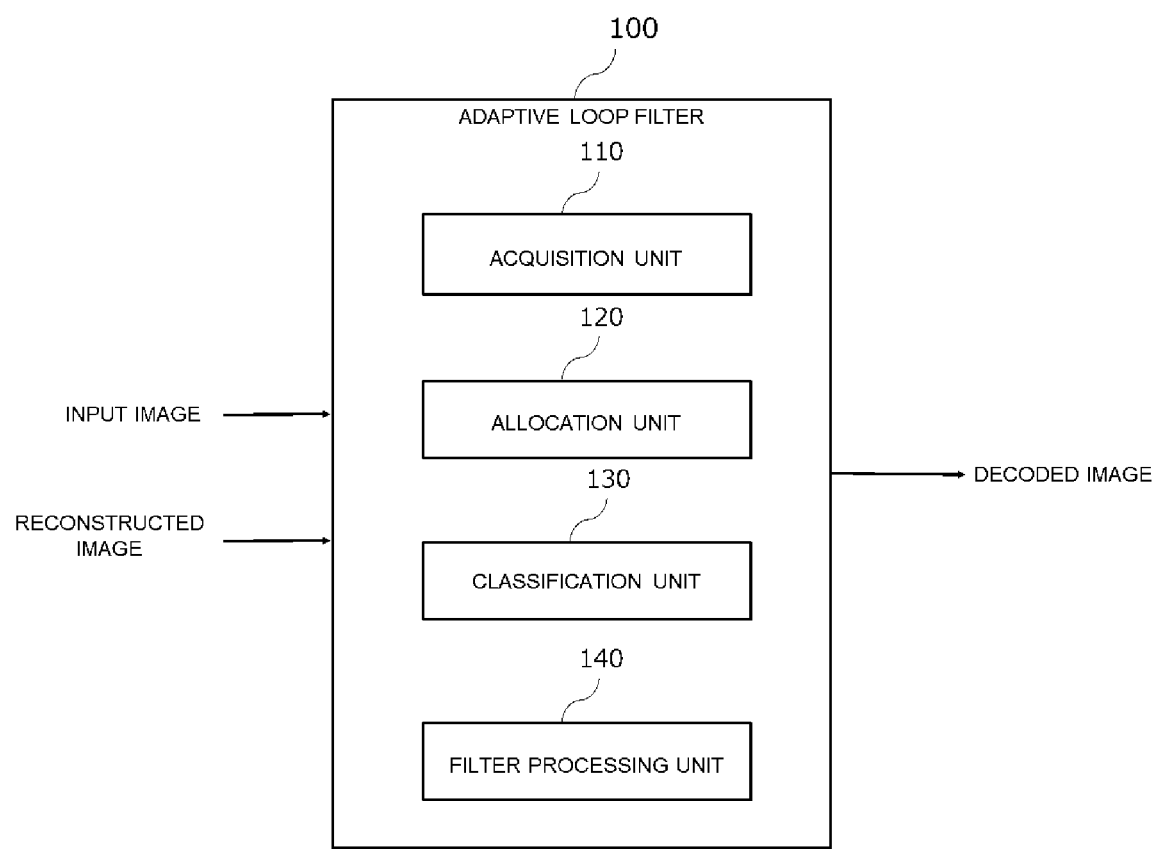
FIG. 9 is a block diagram illustrating a schematic configuration of an adaptive loop filter 100 according to the second example of the first example embodiment.

With reference to FIG. 9, an example of a configuration of the adaptive loop filter 100 will be described. FIG. 9 is a block diagram illustrating a schematic configuration of the adaptive loop filter 100 according to the second example of the first example embodiment. Referring to FIG. 9, the adaptive loop filter 100 includes an acquisition unit 110, an allocation unit 120, a classification unit 130, and a filter processing unit 140. Detailed operation performed in each unit is described below.

1.2.4. Operation Example

Next, an operation example for the second example of the first example embodiment will be described.

According to the second example of the first example embodiment, the acquisition unit 110 of the adaptive loop filter 100 acquires statistical information on a picture to be coded. Further, the allocation unit 120 of the adaptive loop filter 100 allocates a single filter set common to a plurality of blocks included in the picture, based on the statistical information on the picture. In addition, the filter processing unit 140 of the adaptive loop filter 100 executes the above-described adaptive loop filter processing on each of the plurality of blocks, by using the single filter set.

(1) Acquisition of Statistical Information

Specifically, the statistical information on the picture is covariance information on the picture. In this configuration, for example, the acquisition unit 110 of the adaptive loop filter 100 calculates a covariance value for each of blocks included in the picture and having a 4×4 sample size. Specifically, the acquisition unit 110 of the adaptive loop filter 100 calculates the covariance value for each block by referring to an input image of a corresponding block and a reconstructed image with an extended range of the corresponding block. The acquisition unit 110 of the adaptive loop filter 100 can then acquire the sum of the covariance values relating to the respective blocks as the covariance information on the picture.

Figure 10:
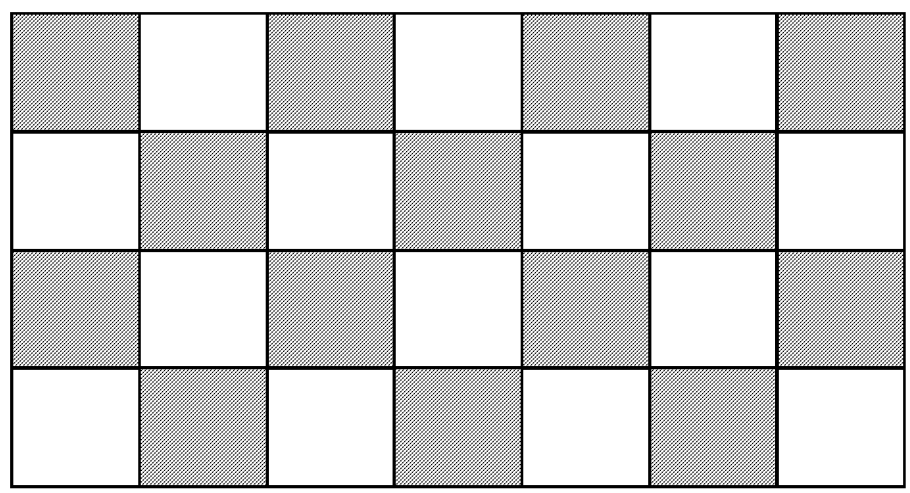
FIG. 10 is an explanatory diagram illustrating an example of calculating statistical information.

Furthermore, the statistical information on the picture may be based on statistical information calculated for blocks having the number of blocks smaller than the total number of blocks included in the picture. FIG. 10 is an explanatory diagram illustrating an example of calculating the statistical information. For example, as illustrated in FIG. 10, the acquisition unit 110 of the adaptive loop filter 100 may thin out all the blocks included in the picture every other block in the horizontal and vertical directions, so that approximately half of the blocks (for example, the blocks indicated by diagonal lines in FIG. 10) may be subject to the calculation of the statistical information. In this way, by reducing the number of blocks subject to the calculation of the statistical information, the amount of calculation can be suppressed. In particular, as the image size of the input image increases, the amount of calculation can be further suppressed.

(2) Class of Block

The classification unit 130 of the adaptive loop filter 100 classifies each of the plurality of blocks into one class of a plurality of classes for the adaptive loop filter processing, based on gradient information of each block. Specifically, the classification unit 130 of the adaptive loop filter 100 refers to the extended reconstructed image to calculate a gradient, and then refers to the gradient to output the class (block classification information) indicating the classification of the block.

Specifically, firstly, the classification unit 130 of the adaptive loop filter 100 calculates gradients in the vertical, horizontal, and diagonal directions for each of samples included in each block by referring to values of neighboring samples. The gradient calculation may use only even or odd sample positions in both the horizontal and vertical directions. This reduces the amount of computation.

Next, the classification unit 130 of the adaptive loop filter 100 compares the magnitude relationship of the gradient calculation results for the respective blocks, and calculates a direction category D based on the result of the comparison. As an example, possible values of the direction category D are integers from 0 to 4. The classification unit 130 of the adaptive loop filter 100 also calculates an amount of change A from the sum of the gradient calculations in the horizontal and vertical directions. As an example, possible values of the amount of change A are integers from 0 to 4.

Next, the classification unit 130 of the adaptive loop filter 100 uses the direction category D and the amount of change A described above to calculate a class C by the formula expressed as $C=5D+A$. In a configuration in which the possible ranges of D and A are both integers from 0 to 4 as described above, the classification unit 130 of the adaptive loop filter 100 calculates the class C corresponding to each block from among 25 candidate classes having the range from 0 to 24.

(3) Allocation of Filter Set

Next, the allocation of the filter set will be described in detail. The allocation unit 120 of the adaptive loop filter 100 allocates the single filter set common to the plurality of blocks included in the picture, from among a plurality of candidate filter sets applicable to the block to be coded. For example, among the above plurality of candidate filter sets, a filter set having the lowest cost related to the difference between the original image and the reconstructed image is allocated as the single filter set.

The plurality of candidate filter sets are a total of 25 candidate filter sets that can be applied to respective classes that can be grouped according to, for example, the gradient of the block and the like. In this configuration, the allocation unit 120 of the adaptive loop filter 100 allocates the single filter set common to the plurality of blocks included in the picture based on the statistical information on the picture, without regard to the classification into the class.

In this way, the allocation unit 120 of the adaptive loop filter 100 can allocate the single filter set common to the plurality of blocks included in the picture, unlike the first example described with reference to FIGS. 3 and 4 above. The allocation unit 120 of the adaptive loop filter 100 does not perform the iterative process as in the first example described by reference to FIGS. 3 and 4 above, for example, and thus can achieve improved compression efficiency while controlling implementation costs.

(4) Execution of Filter Processing

The above-described adaptive loop filter processing is processing for reperforming edge enhancement on the picture to which the deblocking filter and the sample adaptive offset processing have been applied. Specifically, the filter processing unit 140 of the adaptive loop filter 100 reorders filter coefficients included in the single filter set according to the class, and executes the adaptive loop filter processing on the block corresponding to the class, by using the single filter set.

Figure 11:
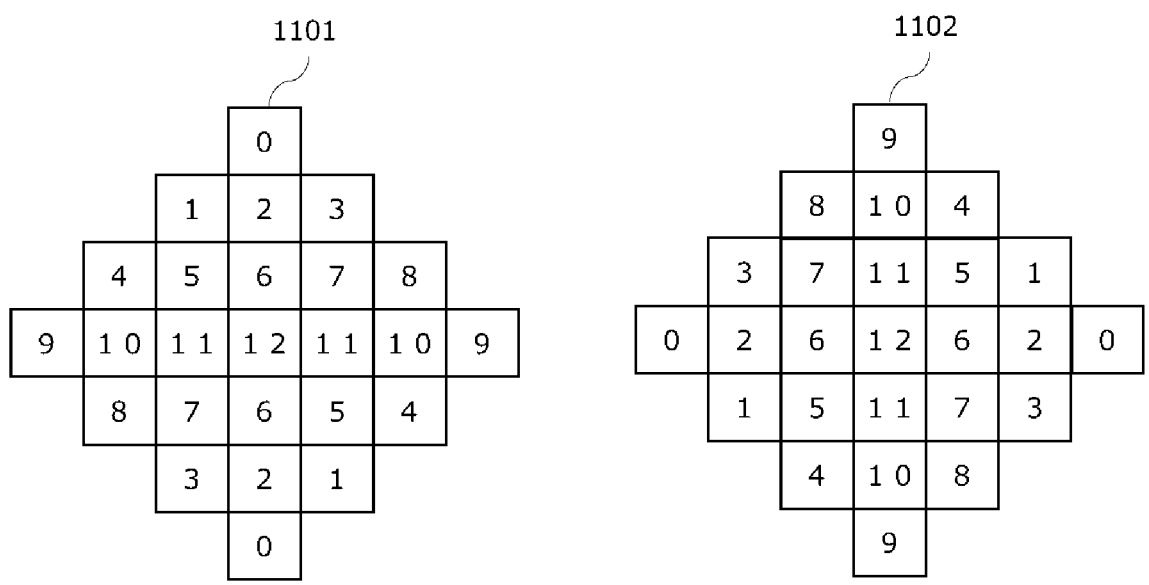
FIG. 11 is an explanatory diagram for schematically describing an example of reordering filter coefficients.

FIG. 11 is an explanatory diagram for schematically describing an example of reordering filter coefficients. Referring to FIG. 11, for example, a reference filter set 1101 is rotated 90 degrees in the right rotation direction according to the class, and thus, the respective filter coefficients (coefficients numbered from 0 to 12) are reordered as in a filter set 1102.

(5) Flow of Processing

Figure 12:
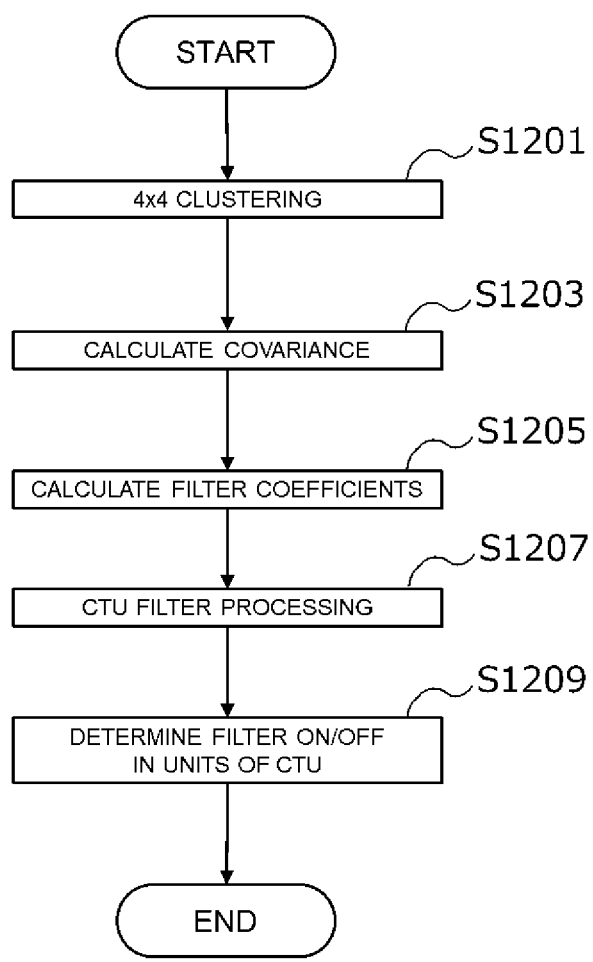
FIG. 12 is a flowchart for describing a flow of processing of an adaptive loop filter 100.

Next, a flow of processing of the adaptive loop filter 100 will be described with reference to FIG. 12. FIG. 12 is a flowchart for describing a flow of processing of the adaptive loop filter 100.

In step S1201, the classification unit 130 of the adaptive loop filter 100 classifies each of the plurality of blocks (e.g., blocks having a 4×4 size) included in the present picture into one class of the plurality of classes for the adaptive loop filter processing, based on the gradient information of each block.

In step S1203, the acquisition unit 110 of the adaptive loop filter 100 calculates a covariance value for each of the blocks having a 4×4 sample size included in the picture, and acquires the sum of the covariance values relating to the respective blocks as the covariance information on the picture.

In step S1205, the allocation unit 120 of the adaptive loop filter 100 allocates a single filter set common to the plurality of blocks included in the picture, based on the statistical information on the picture, and calculates filter coefficients included in the single filter set.

In step S1207, the filter processing unit 140 of the adaptive loop filter 100 executes the adaptive loop filter processing on the block (e.g., Coding Tree Unit, CTU) included in the picture by using the single filter set.

In step S1209, the filter processing unit 140 of the adaptive loop filter 100 determines on/off for the adaptive loop filter processing in units of the block (e.g., Coding Tree Unit, CTU). The processing illustrated in FIG. 12 is then ended.

The processing illustrated in FIG. 12 enables to allocate the single filter set common to the plurality of blocks included in the picture, unlike the first example described with reference to FIGS. 3 and 4 above. The allocation unit 120 of the adaptive loop filter 100 does not perform the iterative process as in the first example described by reference to FIGS. 3 and 4 above, for example, and thus can achieve improved compression efficiency while controlling implementation costs.

(6) Covariance Information Used in Adaptive Loop Filter Processing Related to Color Difference Information For example, in the adaptive loop filter processing related to color difference information, the single filter set may be allocated by using the covariance information as follows.

That is, in a configuration in which the picture includes a plurality of first color difference blocks representing first color difference information (U), and a plurality of second color difference blocks representing second color difference information (V), the acquisition unit 110 of the adaptive loop filter 100 calculates pieces of first color difference statistical information on the plurality of first color difference blocks, and pieces of second color difference statistical information on the plurality of second color difference blocks. Then, the acquisition unit 110 of the adaptive loop filter 100 sums the pieces of first color difference statistical information on the plurality of first color difference blocks to acquire first color difference statistical information on the picture. The acquisition unit 110 of the adaptive loop filter 100 sums the pieces of second color difference statistical information on the plurality of second color difference blocks to acquire second color difference statistical information on the picture.

The allocation unit 120 of the adaptive loop filter 100 allocates a single filter set common to the plurality of first color difference blocks, based on the first color difference statistical information, and allocates a single filter set common to the plurality of second color difference blocks, based on the second color difference statistical information.

In this way, the allocation unit 120 of the adaptive loop filter 100 can obtain the filter sets of the adaptive loop filter 100 suitable for the two respective pieces of the color difference information (U and V), compared with the method for allocating a filter set common to the color difference information U and the color difference information V by using the average value of the covariance information on the color difference information U and the covariance information on the color difference information V, for example.

2. Second Example Embodiment

Next, with reference to FIG. 13, a second example embodiment of the present invention will be described. The above-described first example embodiment is a concrete example embodiment, whereas the second example embodiment is a more generalized example embodiment.

2.1. Configuration

Figure 13:
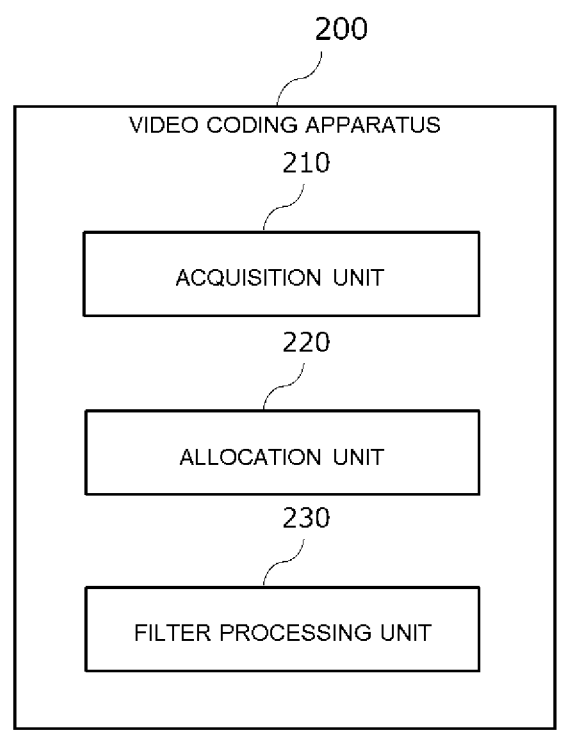
FIG. 13 is a block diagram illustrating an example of a schematic configuration of a video coding apparatus 200 according to a second example embodiment.

FIG. 13 is a block diagram illustrating an example of a schematic configuration of a video coding apparatus 200 according to the second example embodiment. Referring to FIG. 13, the video coding apparatus 200 includes an acquisition unit 210, an allocation unit 220, and a filter processing unit 230.

2.2. Operation Example

Next, an operation example of the second example embodiment will be described.

In the second example embodiment, the acquisition unit 210 of the video coding apparatus 200 acquires statistical information on a picture to be coded. The allocation unit 220 of the video coding apparatus 200 allocates a single filter set common to a plurality of blocks included in the picture, based on the statistical information on the picture. Further, the filter processing unit 230 of the video coding apparatus 200 executes the adaptive loop filter processing on each of the plurality of blocks, by using the single filter set.

For example, the video coding apparatus 200 may perform the operations of the adaptive loop filter 100 according to the first example embodiment. In this configuration, the acquisition unit 210 according to the second example embodiment performs the operations of the acquisition unit 110 according to the first example embodiment. The allocation unit 220 according to the second example embodiment performs the operations of the allocation unit 120 according to the first example embodiment. The filter processing unit 230 according to the second example embodiment performs at least some of the operations of the filter processing unit 140 according to the first example embodiment.

Descriptions have been given above of the second example embodiment. According to the second example embodiment, for example, it is possible to achieve improved compression efficiency while controlling implementation costs.

3. Other Example Embodiments

Descriptions have been given above of the example embodiments of the present invention. However, the present invention is not limited to these example embodiments. It should be understood by those of ordinary skill in the art that these example embodiments are merely examples and that various example alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

Methods including processing of the constituent elements (e.g., the acquisition unit, the allocation unit and/or the filter processing unit) included in the apparatus described in the Specification may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as in the following supplementary notes, but are not limited to the following.

(Supplementary Note 1)

A video coding apparatus comprising:
an acquisition unit configured to acquire statistical information on a picture to be coded;
an allocation unit configured to allocate a single filter set common to a plurality of blocks included in the picture, based on the statistical information on the picture; and
a filter processing unit configured to execute adaptive loop filter processing on each of the plurality of blocks, by using the single filter set.

(Supplementary Note 2)

The video coding apparatus according to Supplementary Note 1, wherein the allocation unit is configured to allocate the single filter set common to the plurality of blocks included in the picture, from among a plurality of candidate filter sets applicable to a block to be coded.

(Supplementary Note 3)

The video coding apparatus according to Supplementary Note 1 or 2, wherein the picture includes a plurality of first color difference blocks representing first color difference information, and a plurality of second color difference blocks representing second color difference information,
the statistical information on the picture includes first color difference statistical information on the plurality of first color difference blocks, and second color difference statistical information on the plurality of second color difference blocks, and
the allocation unit is configured to
allocate a single filter set common to the plurality of first color difference blocks, based on the first color difference statistical information, and
allocate a single filter set common to the plurality of second color difference blocks, based on the second color difference statistical information.

(Supplementary Note 4)

The video coding apparatus according to any one of Supplementary Notes 1 to 3, wherein the statistical information on the picture is based on statistical information calculated for blocks having a number of blocks smaller than a total number of blocks included in the picture.

(Supplementary Note 5)

The video coding apparatus according to any one of Supplementary Notes 1 to 4, wherein the adaptive loop filter processing is processing for reperforming edge enhancement with respect to a deblocking-filtered picture.

(Supplementary Note 6)

The video coding apparatus according to any one of Supplementary Notes 1 to 5, further comprising a classification unit configured to classify each of the plurality of blocks into one class of a plurality of classes for the adaptive loop filter processing, based on gradient information of each block,
wherein the allocation unit is configured to allocate the single filter set common to the plurality of blocks included in the picture based on the statistical information on the picture, without regard to the classification into the class.

(Supplementary Note 7)

The video coding apparatus according to Supplementary Note 6, wherein the filter processing unit is configured to
reorder filter coefficients included in the single filter set according to the class, and
execute the adaptive loop filter processing on a block corresponding to the class, by using the single filter set.

(Supplementary Note 8)

The video coding apparatus according to any one of Supplementary Notes 1 to 7, wherein the statistical information on the picture is covariance information on the picture.

(Supplementary Note 9)

A video coding method comprising:
acquiring statistical information on a picture to be coded;
allocating a single filter set common to a plurality of blocks included in the picture, based on the statistical information on the picture; and
executing adaptive loop filter processing on each of the plurality of blocks, by using the single filter set.

(Supplementary Note 10)

A video coding program causing a processor to execute:
acquiring statistical information on a picture to be coded;
allocating a single filter set common to a plurality of blocks included in the picture, based on the statistical information on the picture; and executing adaptive loop filter processing on each of the plurality of blocks, by using the single filter set.

(Supplementary Note 11)

A non-transitory computer readable recording medium storing a program that causes a processor to execute:

acquiring statistical information on a picture to be coded;

allocating a single filter set common to a plurality of blocks included in the picture, based on the statistical information on the picture; and executing adaptive loop filter processing on each of the plurality of blocks, by using the single filter set.

This application claims priority based on JP 2021-049038 filed on Mar. 23, 2021, the entire disclosure of which is incorporated herein.

INDUSTRIAL APPLICABILITY

In a system for coding or decoding video, it is possible to adaptively control the usage range of an image used for in-screen prediction.

REFERENCE SIGNS LIST 1, 200, 1000 Video Coding Apparatus
60, 1060 Loop Filter
100, 1065 Adaptive Loop Filter
110, 210 Acquisition Unit
120, 220 Allocation Unit
130 Classification Unit
140, 230 Filter Processing Unit

What is claimed is:

1. A video coding apparatus comprising:
one or more memories storing instructions; and
one or more processors configured to execute the instructions to:
classify each of a plurality of blocks included in a picture to be coded into one class of a plurality of classes for adaptive loop filter processing, based on gradient information of each block;
acquire statistical information on the picture based on the class;
allocate a single filter set common to the plurality of blocks included in the picture, based on the statistical information on the picture; and
execute adaptive loop filter processing on each of the plurality of blocks, by using the single filter set.

2. The video coding apparatus according to claim 1, wherein the one or more processors are configured to allocate the single filter set common to the plurality of blocks included in the picture, from among a plurality of candidate filter sets applicable to a block to be coded.

3. The video coding apparatus according to claim 1, wherein the picture includes a plurality of first color difference blocks representing first color difference information, and a plurality of second color difference blocks representing second color difference information,
wherein the statistical information on the picture includes first color difference statistical information on the plurality of first color difference blocks, and second color difference statistical information on the plurality of second color difference blocks, and
wherein the one or more processors are configured to:
allocate a single filter set common to the plurality of first color difference blocks, based on the first color difference statistical information; and
allocate a single filter set common to the plurality of second color difference blocks, based on the second color difference statistical information.

4. The video coding apparatus according to claim 1, wherein the statistical information on the picture is based on statistical information calculated for blocks having a number of blocks smaller than a total number of blocks included in the picture.

5. The video coding apparatus according to claim 1, wherein the adaptive loop filter processing is processing for reperforming edge enhancement with respect to a deblocking-filtered picture.

6. The video coding apparatus according to claim 1, wherein the one or more processors are configured to:
reorder filter coefficients included in the single filter set according to the class; and
execute the adaptive loop filter processing on a block corresponding to the class, by using the single filter set.

7. The video coding apparatus according to claim 1, wherein the statistical information on the picture is covariance information on the picture.

8. A video coding method comprising:
classifying each of a plurality of blocks included in a picture to be coded into one class of a plurality of classes for adaptive loop filter processing, based on gradient information of each block;
acquiring statistical information on the picture based on the class;
allocating a single filter set common to the plurality of blocks included in the picture, based on the statistical information on the picture; and
executing adaptive loop filter processing on each of the plurality of blocks, by using the single filter set.

9. The video coding method according to claim 8, wherein the allocating includes allocating the single filter set common to the plurality of blocks included in the picture, from among a plurality of candidate filter sets applicable to a block to be coded.

10. The video coding method according to claim 8, wherein the picture includes a plurality of first color difference blocks representing first color difference information, and a plurality of second color difference blocks representing second color difference information,
wherein the statistical information on the picture includes first color difference statistical information on the plurality of first color difference blocks, and second color difference statistical information on the plurality of second color difference blocks, and
wherein the allocating includes:
allocating a single filter set common to the plurality of first color difference blocks, based on the first color difference statistical information; and
allocating a single filter set common to the plurality of second color difference blocks, based on the second color difference statistical information.

11. The video coding method according to claim 8, wherein the statistical information on the picture is based on statistical information calculated for blocks having a number of blocks smaller than a total number of blocks included in the picture.

12. The video coding method according to claim 8, wherein the adaptive loop filter processing is processing for reperforming edge enhancement with respect to a deblocking-filtered picture.

13. A non-transitory computer readable recording medium storing a program that causes a processor to execute:

classifying each of a plurality of blocks included in a picture to be coded into one class of a plurality of classes for adaptive loop filter processing, based on gradient information of each block;

acquiring statistical information on the picture based on the class;

allocating a single filter set common to the plurality of blocks included in the picture, based on the statistical information on the picture; and executing adaptive loop filter processing on each of the plurality of blocks, by using the single filter set.

14. The non-transitory computer readable recording medium according to claim 13, wherein the allocating includes allocating the single filter set common to the plurality of blocks included in the picture, from among a plurality of candidate filter sets applicable to a block to be coded.

15. The non-transitory computer readable recording medium according to claim 13, wherein the picture includes a plurality of first color difference blocks representing first color difference information, and a plurality of second color difference blocks representing second color difference information, wherein the statistical information on the picture includes first color difference statistical information on the plurality of first color difference blocks, and second color difference statistical information on the plurality of second color difference blocks, and wherein the allocating includes:
  allocating a single filter set common to the plurality of first color difference blocks, based on the first color difference statistical information; and
  allocating a single filter set common to the plurality of second color difference blocks, based on the second color difference statistical information.

16. The non-transitory computer readable recording medium according to claim 13, wherein the statistical information on the picture is based on statistical information calculated for blocks having a number of blocks smaller than a total number of blocks included in the picture.

17. The non-transitory computer readable recording medium according to claim 13, wherein the adaptive loop filter processing is processing for reperforming edge enhancement with respect to a deblocking-filtered picture.

* * * * *